United States Patent Office 3,296,003
Patented Jan. 3, 1967

3,296,003
GLASS MANUFACTURE
Howard R. Swift and Lawrence B. Ginther, Toledo, Ohio, assignors to Libbey-Owens-Ford Glass Company, Toledo, Ohio, a corporation of Ohio
No Drawing. Filed Sept. 20, 1963, Ser. No. 310,452
14 Claims. (Cl. 106—47)

The present invention relates broadly to the manufacture of glass and more particularly to the successive production of different kinds of glass in a single, continuous, tank-type glass furnace.

As explained in U.S. Patent No. 2,900,264, issued August 18, 1959 to W. F. Brown, it has already been proposed to change from one kind of glass to another during the continuous operation of a tank-type furnace by a so-called "doping" and "undoping" of the melting tank.

This procedure has already largely replaced the former practice of shutting down a furnace, draining and starting over again with a clean tank whenever it was desired to change from the production of regular sheet or window glass in a continuous tank furnace to the production of heat-absorbing, glare-resisting and/or specially colored glass in the same furnace.

The advantages and savings resulting from doping as opposed to draining a glass tank for these purposes have been considerable. However, the transistion period, i.e., the period between saving commercially acceptable glass of one kind and saving commercially acceptable glass of the other kind, even with the doping and undoping procedure, may extend anywhere from several hours to a few days; and this represents a loss from production for that period of a tank furnace which may contain around 1000 tons of molten glass and have a productive capacity of anywhere from 100 to 300 or more tons per day.

Now it is the primary object of the present invention to materially reduce the length of at least one of the transition or "throw-away" periods during the doping and undoping of a continuous glass tank furnace.

Briefly stated this is accomplished by increasing the density of the doping or undoping glass (i.e., the glass being added to the furnace during the doping or undoping period) to a value sufficiently greater than the density of the glass already in the furnace so that the heavier doping or undoping glass, as it is introduced, will sink and so more efficiently displace the glass already there and act to flush the latter from the furnace.

Another object of the invention, therefore, is to treat the glass and/or the glass batch being introduced into a furnace during a doping or undoping procedure of the character described to alter the density thereof.

Another object is the provision of a glass density changing step in a conventional doping or undoping procedure.

Another object is to change the density of a doping or undoping batch or glass by altering its composition.

Still another object is to increase the density of the doping or undoping glass by the addition of a material such as barium oxide, lead oxide, zinc oxide or mixture thereof that will not adversely affect the properties of the glass.

Further objects and advantages of the invention will become more apparent during the course of the following description.

It will also become apparent that the invention is in no way restricted to use with any specific base glass or any specific modified base or different glass or any particular type of continuous glass melting furnace.

However, the invention has to date been of particular value in connection with the doping of conventional continuous plate or window glass furnaces containing regular, substantially colorless, soda-lime-silica glasses to produce colored, glare-resistant, heat-absorbing glasses; and then undoping these furnaces to again produce regular sheet or plate glass.

In this connection it might be added that the invention has proved valuable in doping a regular plate or sheet glass composition to produce glare-resisting glasses of tints varying from green to grey and bronze but it will be specifically described here in connection with the production of a more or less conventional green tinted heat-absorbing glass that is widely sold and used commercially.

Thus, a representative regular plate glass composition is as follows:

CHEMICAL ANALYSIS

| Constituent: | Percent of constituent |
|---|---|
| $SiO_2$ | 71.99 |
| $Fe_2O_3$ | .12 |
| $Al_2O_3$ | .22 |
| $TiO_2$ | .012 |
| CaO | 11.08 |
| MgO | 2.09 |
| $Na_2O$ | 13.92 |
| $SO_3$ | .50 |
| $As_2O_5$ | .12 |
| Total | 100.052 |

And a representative regular sheet glass composition is:

CHEMICAL ANALYSIS

| Constituent: | Percent of constituent |
|---|---|
| $SiO_2$ | 72.50 |
| $Fe_2O_3$ | .15 |
| $Al_2O_3$ | 1.11 |
| $TiO_2$ | .042 |
| CaO | 8.62 |
| MgO | 3.79 |
| $Na_2O$ | 13.36 |
| $K_2O$ | .09 |
| $SO_3$ | .24 |
| $As_2O_5$ | .10 |
| Total | 100.002 |

Known commercial glare-resisting, heat-absorbing and variously colored glasses corresponding generally to these regular sheet and plate glasses differ therefrom only by the presence of additional iron and/or other coloring or absorbing materials. By way of illustration, the variations of ingredients present in one representative commercial glare-resistant and one highly glare-resistant glass, from those in the representative regular plate glass are shown in the table below:

| Material | Percent in Regular Plate Glass | Percent in Glare-Resistant Glass | Percent in Highly Glare-Resistant Glass |
|---|---|---|---|
| $Fe_2O_3$ | 0.120 | 0.475 | 5.0 |
| $Co_3O_4$ | 0.000 | 0.0008 | 0.000 |

When discussed herein the amount of iron is expressed as percent $Fe_2O_3$, but it is to be understood that some of the iron in the glare-resistant glass is in the form of FeO. For example, the statement that the desired glare-resistant glass contains 0.475% $Fe_2O_3$ is not to be construed to mean that the $Fe_2O_3$ actually existing in the glass amounts to 0.475%, but that if all of the iron were in the form of $Fe_2O_3$, the amount would be 0.475%. The figure is given to represent the iron in the glass and for the sake of convenience it is based on percent $Fe_2O_3$. Also, it should be understood that there may be a variation in some of the other components of the finished glass, but that the variation in the concentration of iron and/or other colorant is the important factor.

In the examples hereinafter given to illustrate the transition from regular to glare-resistant glass and from glare-resistant to regular glass, a tank was used which contains about 1100 tons of molten glass and about 350 tons of batch was filled into it while approximately 280 tons of finished glass was removed from it during each 24 hour period.

During the period that the glass is being changed from regular to glare-resistant glass or vice versa, the glass is of questionable commercial value. Accordingly, it is important to have a transition period of as short a duration as possible in order to prevent the accumulation of large quantities of this glass which may be unmarketable. It is contemplated that this glass may be analyzed and used as a cullet in a special batch for the production of glare-resistant glass but this requires an analysis to determine the percentage of iron and cobalt so that the percentage of these materials may be properly adjusted in the batch. The exact percentage for glare-resistant glass is not too critical for some purposes although when such glass is used for automobile glass, for example, it must satisfy the Federal specifications and the A.S.A. code. However, the main reason that transition glass is generally useless except as cullet is because such glass usually contains ream which disturbs the optical properties of the glass.

In changing from the regular to the glare-resistant glass of the table the deficiency of $Fe_2O_3$ in the tank is .355% or 7810 lbs. in the 1100 tons of glass material in the tank. Since the rouge used in the batch contains 99.4% $Fe_2O_3$, 7857 lbs. of rouge would be needed for 100% conversion of the regular glass in the tank. The amount of $Co_3O_4$ required for 100% conversion of the regular glass in the tank is 17.6 lbs. In order to prevent the addition of too much $Fe_2O_3$ and $Co_3O_4$, fixed percentages of these calculated deficiencies are added; and since the glass first removed contains less than the required amounts of $Fe_2O_3$, the calculated amount for 100% conversion of the material in the tank is never actually added. Generally the glare-resistant composition is obtained in the tank when about 43%–75% of these calculated amounts are added. The more rapid the rate of conversion the higher this percentage becomes. When the rate of transition is too high, that is with more than 75% of the calculated amounts added, ream problems become serious, and actually lengthen the transition time from good regular glass to optically good glare-resistant glass, or may even seriously upset the balance of the tank. However, high transition rates are desired, and although percentages smaller than 43% may be operable, the transition period becomes excessively long.

Doping and undoping procedures as followed prior to the present invention are illustrated by the following examples:

Example 1

In changing from regular to glare-resistant glass, the theoretically required amount of $Fe_2O_3$ and $Co_3O_4$ was calculated as shown above. During a 15 hour period, 70% of this amount was added to the batch used for making glare-resistant glass. The glass being removed then had substantially the desired composition and the furnace was operated and any further adjustments made according to the usual procedure for making glare-resistant glass.

Example 2

In changing from glare-resistant glass to regular glass, the $Fe_2O_3$ and $Co_3O_4$ are entirely eliminated in the batch ingredients and the process continued until the finished glass on the run contains about 0.035% $Fe_2O_3$. Then the normal batch is added which is used to produce glass having 0.12% $Fe_2O_3$. The finished glass is analyzed for $Fe_2O_3$ at least every twelve hours and the results are plotted in the conventional form to determine when the composition will reach 0.035% $Fe_2O_3$. Such low iron glass is suitable as regular glass, since formerly the percent of $Fe_2O_3$ in regular glass made by the company to which this application is assigned was 0.04. The transition will require around five days.

In the following examples given to illustrate the transition from glare-resistant to highly glare-resistant glass, the tank used contained 700 tons of molten glass and about 200 tons of batch was added per day. In making this change from glare-resistant to highly glare-resistant glass, the theoretical deficiency of iron was calculated in the same manner as hereinbefore set forth for the conversion from regular to glare-resistant glass.

Example 3

In changing from glare-resistant to highly glare-resistant glass (see the table), the theoretical deficiency of $Fe_2O_3$ was calculated. Generally the desired highly glare-resistant composition was obtained when about 50% of the calculated deficiency had been added. This smaller percentage was due to the fact that the transition period was longer than is usually the case when changing from regular to glare-resistant glass. A tank containing 700 tons of glare-resistant glass material, which was being filled with 200 tons of batch per day, was charged with batch material for highly glare-resistant glass. During each of the first three days iron was added at the rate of one-eighth of the deficiency, and during the first half of the fourth day this rate was continued. At this time the glass being removed was close to the desired composition so that during the last half of the fourth day, one thirty-second of the deficiency was added. At the end of the fourth day the transition had been completed with a total of 46.875% of the calculated deficiency of iron having been added.

Example 4

In changing from highly glare-resistant to glare-resistant glass, the $Fe_2O_3$ was entirely eliminated from the batch ingredients and the process continued until the finished glass removed from the tank had the required amount of $Fe_2O_3$ for glare-resistant glass. Then the regular batch for glare-resistant glass was added. Using the tank described in Example 3 the transition required about seven days.

The doping and undoping procedures set forth above have had the advantage of keeping the furnaces in continuous operation and no seed trouble has been encountered in the process. However, as noted, ream does present a problem. This is particularly true during undoping and we have determined that it is due to the fact that regular plate glass, for example, has a density approximately .0045 gms./cc. less than the corresponding higher iron glare-resisting glass. Consequently, during undoping, i.e., feeding iron-free batch, the resulting lighter iron-free glass tends to float on the surface of the melt and therefore comes through the furnace rapidly. This results in ream which makes it necessary to throw the glass away earlier than would otherwise be necessary during the undoping. Moreover, the time required for the transition from glare-resistant to regular is increased by the premature flow-through of the lower iron glass since the fastest possible decrease in iron is achieved by having high iron glass being pulled from the furnace for as long as possible.

This is true to an even greater degree in undoping directly to regular glass from the highly glare-resistant glass.

According to the present invention, however, the throwaway time can be decreased substantially by slightly altering the composition of the undoping iron-free batch so as to increase its density to a value slightly greater than that of the glare-resistant glass. The iron-free undoping glass will then sink and displace the higher iron glare-resistant glass and thereby flush the latter from the furnace. After the undoping proceeds far enough so that the glare-resistant glass being produced is no longer of savable quality, the iron-free batch should be changed to regular batch.

One economical means for accomplishing the density change without a drastic composition change is by the addition of as little as approximately 0.26% of an oxide such as barium oxide to the undoping glass. This can be accomplished by adding 7.86 lbs. of barium sulfate per 1000 lbs. sand to the batch. With a 600 lbs. cullet ratio and a fill of 390 tons per day, for example, this will amount to 114.4 lbs. barium sulfate per hour or slightly over one and one half tons of barium sulfate for 24 hours.

The barium-containing glass will be very slightly more fluid than the regular glass. It will not be colored any differently than regular glass and will not show any difference in further processing. Moreover, most of the barium-containing glass will be flushed from the system during the latter stages of undoping and will not end up in regular production.

Although, as will be apparent from the above, this invention is especially valuable in connection with the undoping phase of a doping and undoping procedure it also has an important application and can be effectively used to reduce the transition period in the doping phase.

Thus, although the higher iron doping glass, because it normally has a greater density, will inherently tend to sink and displace the lower iron glass in the furnace during doping, this tendency can be increased and the action of the doping glass in flushing the lower iron regular glass from the furnace can be accelerated by further increasing the density of the higher iron doping glass in the same manner as has been described in connection with increasing the density of the undoping glass, i.e., by the addition of materials such as barium oxide, lead oxide or zinc oxide.

As previously pointed out, instead of adding barium oxide to the doping or undoping glass as described in the preferred example by adding barium sulfate to the batch, other oxides capable of acting in a similar manner such as lead oxide and zinc oxide may be incorporated by the addition of compounds of these materials. In fact, any usable compound of barium, lead or zinc, or any combination thereof can be added to produce an oxide or oxides in the glass that will be satisfactory for the purpose. In some instances a combination of oxides may give better or more accurately controllable results than a single oxide.

The .26% barium oxide given in the specific example will give excellent results in undoping from glare-resistant to regular glass; and similar results will be obtained from .24% lead oxide or .31% zinc oxide. However, for all-around use for both doping and undoping and with various types of iron-containing and especially colored glasses varying amounts both above and below these percentages can be used to advantage. Generally speaking, however, amounts within the following ranges will give the best results:

| | Percent |
|---|---|
| BaO | .26 to .52 |
| PbO | .24 to .48 |
| ZnO | .31 to .62 |

It is to be understood that the forms of the invention herewith described are to be taken as illustrative embodiments only of the same, and that various procedural changes may be resorted to without departing from the spirit of the invention.

We claim:

1. In a method of changing from the production of a glass of one kind to a glass of a similar composition but different kind in a continuously operating tank furnace during the continuous operation thereof, the steps of adding to said first mentioned glass in said continuously operating furnace glass batch materials calculated to change the contents of said furnace from said first mentioned glass to said second mentioned glass during a transition period, and additionally adding a material that will increase the density of the resulting glass to said added glass batch materials.

2. A method as defined in claim 1 in which said density increasing material comprises a compound of barium.

3. A method as defined in claim 1 in which said density increasing material comprises a compound of lead.

4. A method as defined in claim 1 in which said density increasing material comprises a compound of zinc.

5. A method as defined in claim 1 in which said density increasing material comprises a compound of barium and a compound of lead.

6. A method as defined in claim 1 in which said density increasing material comprises a compound of barium and a compound of zinc.

7. A method as defined in claim 1 in which said density increasing material comprises a compound of lead and a compound of zinc.

8. In the manufacture of glass, a method of changing from the production of a glass containing an appreciable amount of iron oxide to the production of regular glass containing a lesser amount of iron oxide in a continuously operating tank furnace during the continuous operation thereof comprising, adding a regular glass batch substantially void of iron oxide and a material that will increase the density of the glass resulting from said batch to said continuously operating tank furnace during a transition period until the finished glass being removed from said tank furnace has approximately the desired percentage of iron oxide required for regular glass, and thereafter adding to the tank furnace glass batch material comprised of the desired proportion of the various ingredients required for the production of the regular glass.

9. A method as defined in claim 8 in which said density increasing material comprises a compound of barium.

10. A method as defined in claim 8 in which said density increasing material comprises a compound of lead.

11. A method as defined in claim 8 in which said density increasing material comprises a compound of zinc.

12. In a method of changing from the production of a glass of one kind to a glass of a similar composition but different kind in a continuously operating tank furnace during the continuous operation thereof, the step of adding to said first mentioned glass in said continuously operating furnace a third glass of a composition calculated to change the contents of said furnace from said first mentioned glass to said second mentioned glass during a transition period and which contains between about .26 and .52% barium oxide.

13. In a method of changing from the production of a glass of one kind to a glass of a similar composition but different kind in a continuously operating tank furnace during the continuous operation thereof, the step of adding to said first mentioned glass in said continuously operating furnace a third glass calculated to change the contents of said furnace from said first mentioned glass to said second mentioned glass during a transition period and which contains between about .24 and .48% lead oxide.

14. In a method of changing from the production of a glass of one kind to a glass of a similar composition but different kind in a continuously operating tank furnace during the continuous operation thereof, the step of adding to said first mentioned glass in said continuously operating furnace a third glass calculated to change the contents of said furnace from said first mentioned glass to said second mentioned glass during the transition period and which contains between about .31 and .62% zinc oxide.

References Cited by the Examiner

UNITED STATES PATENTS

| 1,944,616 | 1/1934 | Skola | 65—134 |
| 2,144,943 | 1/1939 | Sharp et al. | 106—52 |
| 2,900,264 | 8/1959 | Brown | 106—47 |
| 3,220,861 | 11/1965 | Parry et al. | 106—52 |

TOBIAS E. LEVOW, *Primary Examiner.*

H. McCARTHY, *Assistant Examiner.*